(12) United States Patent
Olden

(10) Patent No.: US 8,403,267 B2
(45) Date of Patent: Mar. 26, 2013

(54) EJECTION SYSTEM AND A METHOD FOR EJECTING A PAYLOAD FROM A PAYLOAD DELIVERY VEHICLE

(75) Inventor: Thomas A. Olden, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 261 days.

(21) Appl. No.: 12/955,436

(22) Filed: Nov. 29, 2010

(65) Prior Publication Data
US 2012/0132757 A1  May 31, 2012

(51) Int. Cl.
*B64C 1/22* (2006.01)
(52) U.S. Cl. .................... 244/137.1; 244/137.3
(58) Field of Classification Search .......... 244/137.1, 244/137.3, 158.1, 158.5
See application file for complete search history.

(56) References Cited

U.S. PATENT DOCUMENTS

| | | | | |
|---|---|---|---|---|
| 4,522,356 A | * | 6/1985 | Lair et al. ..................... | 244/3.15 |
| 5,005,481 A | * | 4/1991 | Schneider et al. ............ | 102/393 |
| 5,005,483 A | * | 4/1991 | Deffayet ....................... | 102/489 |
| 5,107,767 A | * | 4/1992 | Schneider et al. ............ | 102/393 |
| 5,225,627 A | * | 7/1993 | Phillips et al. ............... | 102/351 |
| 5,577,431 A | * | 11/1996 | Kusters ......................... | 89/1.51 |
| 5,760,330 A | * | 6/1998 | Himmert et al. .............. | 102/489 |
| 5,907,117 A | * | 5/1999 | Persson et al. ................ | 89/1.11 |
| 6,672,220 B2 | * | 1/2004 | Brooks et al. ................. | 102/489 |
| 7,493,843 B2 | * | 2/2009 | Grosch et al. ................. | 89/1.13 |
| 7,540,227 B2 | * | 6/2009 | McCants Jr. .................. | 89/1.819 |
| 8,113,101 B1 | * | 2/2012 | McCants, Jr. ................. | 89/1.819 |
| 8,281,697 B2 | * | 10/2012 | McCants, Jr. ................. | 89/1.11 |
| 2004/0065779 A1 | * | 4/2004 | Karpov et al. ................ | 244/137.3 |
| 2011/0084162 A1 | * | 4/2011 | Goossen et al. .............. | 244/12.1 |
| 2012/0132757 A1 | * | 5/2012 | Olden ........................... | 244/137.1 |
| 2012/0210852 A1 | * | 8/2012 | McCants, Jr. ................. | 89/1.8 |

* cited by examiner

*Primary Examiner* — Christopher P Ellis
*Assistant Examiner* — Medhat Badawi
(74) *Attorney, Agent, or Firm* — Renner, Otto, Boisselle & Sklar, LLP

(57) ABSTRACT

An ejection system for ejecting a payload from a payload delivery vehicle is provided. The ejection system includes an airbag ejection system configured to eject the payload from the payload delivery vehicle, a payload separation system configured to selectively couple the payload to the airbag ejection system, and a controller configured to inflate the airbag ejection system and further configured to signal the payload separation system to release the payload from the airbag ejection system.

7 Claims, 7 Drawing Sheets

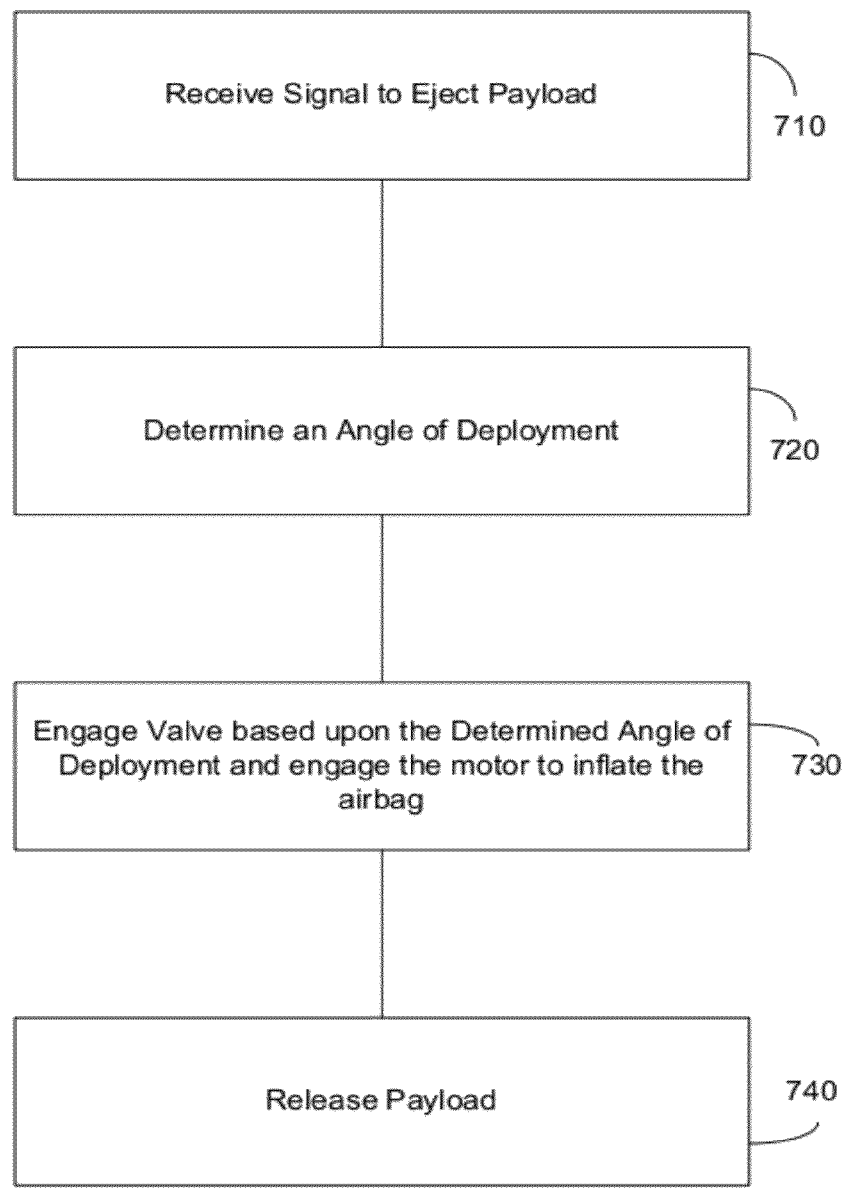

EJECTION SYSTEM AND A METHOD FOR EJECTING A PAYLOAD FROM A PAYLOAD DELIVERY VEHICLE

TECHNICAL FIELD

Embodiments of the subject matter described herein relate generally an ejection system, and more particularly to using an airbag to eject a payload from a payload delivery vehicle operating in either inner or outer atmospheric conditions.

BACKGROUND

Payload deployment systems are commonly utilized onboard delivery vehicles (e.g., aircraft, spacecraft, launch rockets, and the like) to deploy one or more payloads at a desired time of deployment. Generally, it is desirable for such systems to deploy the payload along a desired velocity vector with a high degree of accuracy. At the same time, it is desirable for such payload deployment systems to be highly reliable and relatively inexpensive to implement. While payload deployment systems are known that utilize pyrotechnic devices and/or spring-loaded rail devices to deploy a desired payload, such systems tend to be undesirably heavy, bulky, and costly. In addition, while such systems may provide sufficient accuracy in cases wherein the delivery vehicle is a maneuverable aircraft or spacecraft and a certain margin of error is acceptable in deployment of the payload, such systems are often incapable of providing sufficiently accurate payload deployment in instances wherein the delivery vehicle is a high velocity rocket and the payload (e.g., a maneuvering vehicle) must be deployed in a relatively limited spatial area and with a specific velocity vector to, for example, intercept or otherwise defeat an incoming threat traveling at a high rate of speed.

Accordingly, there is a need for improved systems and methods for ejecting a payload from a payload delivery vehicle. Other desirable features and characteristics will become apparent from the subsequent detailed description and the appended claims, taken in conjunction with the accompanying drawings and the foregoing technical field and background.

BRIEF SUMMARY

In accordance with one embodiment, an ejection system for ejecting a payload from a payload delivery vehicle is provided. The ejection system includes an airbag ejection system configured to eject the payload from the payload delivery vehicle, a payload separation system configured to selectively couple the payload to the airbag ejection system, and a controller configured to inflate the airbag ejection system and further configured to signal the payload separation system to release the payload from the airbag ejection system.

A method for ejecting a payload from a payload delivery vehicle is also provided. The method includes receiving, by the payload delivery vehicle, a signal to eject the payload, engaging, by the payload delivery vehicle, a motor to inflate an airbag selectively coupled to the payload, and releasing the payload from the airbag.

In accordance with another embodiment, an airbag ejection system for ejecting a payload from a payload delivery vehicle is provided. The airbag ejection system includes a base coupled to the payload delivery vehicle, an airbag coupled to the base, a payload separation system configured to selectively couple the payload to the airbag, a motor configured to inflate the airbag, and a controller configured to engage the motor and further configured to control when the payload separation system releases the payload.

BRIEF DESCRIPTION OF THE DRAWINGS

A more complete understanding of the embodiments may be derived by referring to the detailed description and claims when considered in conjunction with the following figures, wherein like reference numbers refer to similar elements throughout the figures.

FIG. 7 is a flow chart illustrating an exemplary method for operating the ejection system illustrated in FIG. 6.

DETAILED DESCRIPTION OF THE DRAWINGS

The following discussion generally relates to a system and method for ejecting a payload from a payload delivery vehicle. In that regard, the following detailed description is merely illustrative in nature and is not intended to limit the embodiments or the application and uses thereof. Furthermore, there is no intention to be bound by any expressed or implied theory presented in the preceding technical field, background, brief summary or the following detailed description.

Figure 1:
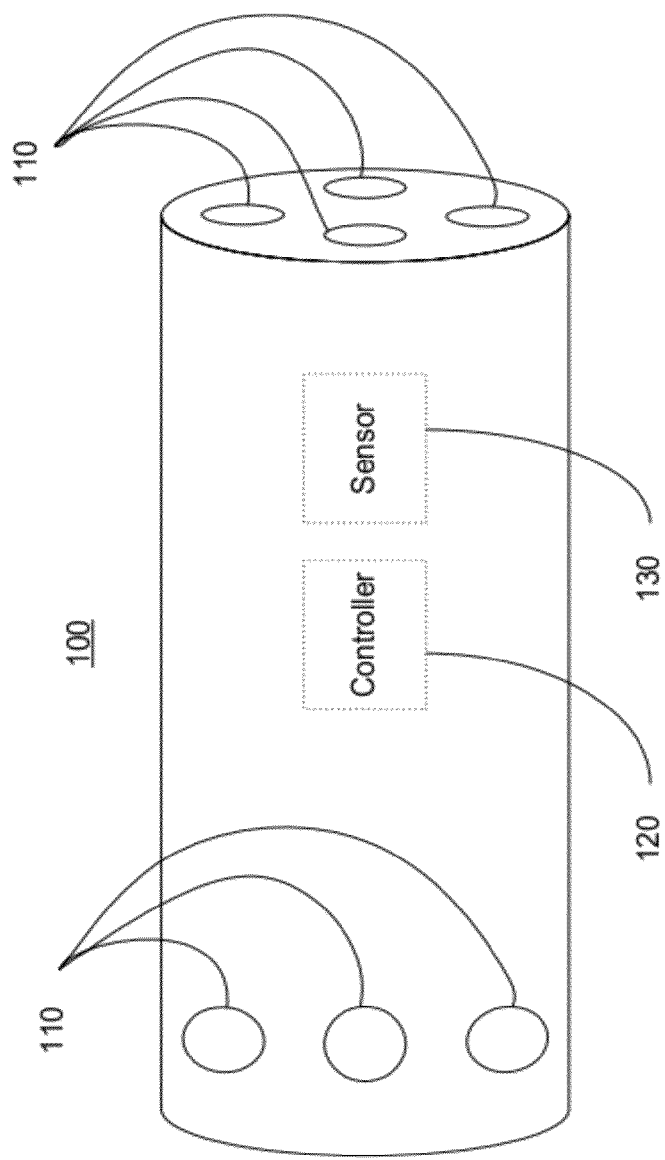
FIG. 1 is an payload delivery vehicle in accordance with an embodiment.

FIG. 1 illustrates a payload delivery vehicle 100 having a plurality of payloads 110 housed therein in accordance with an embodiment. The payload delivery vehicle 100 may be a vehicle capable of operation in inner atmospheric conditions, outer atmospheric conditions or both inner and outer atmospheric conditions. The payload delivery vehicle 100 may be, for example, a vehicle, an aircraft, a space craft, a satellite, an airborne munition or any other object carrying a payload. While the payload delivery vehicle 100 illustrated in FIG. 1 is illustrated to have seven payloads, any number of payloads 110 may be housed in the payload delivery vehicle 100 and may be housed at any position within the payload delivery vehicle 100. The payload delivery vehicle 100 also includes a controller 120 which controls an ejection of the payload no from the payload delivery vehicle 100. The controller may include any combination of hardware and software. The controller 120 may receive input, for example, from a sensor 130 or multiple sensors 130 which may be used to determine how the payload no is to be ejected from the payload delivery vehicle 100, as discussed in further detail below.

Figure 2:
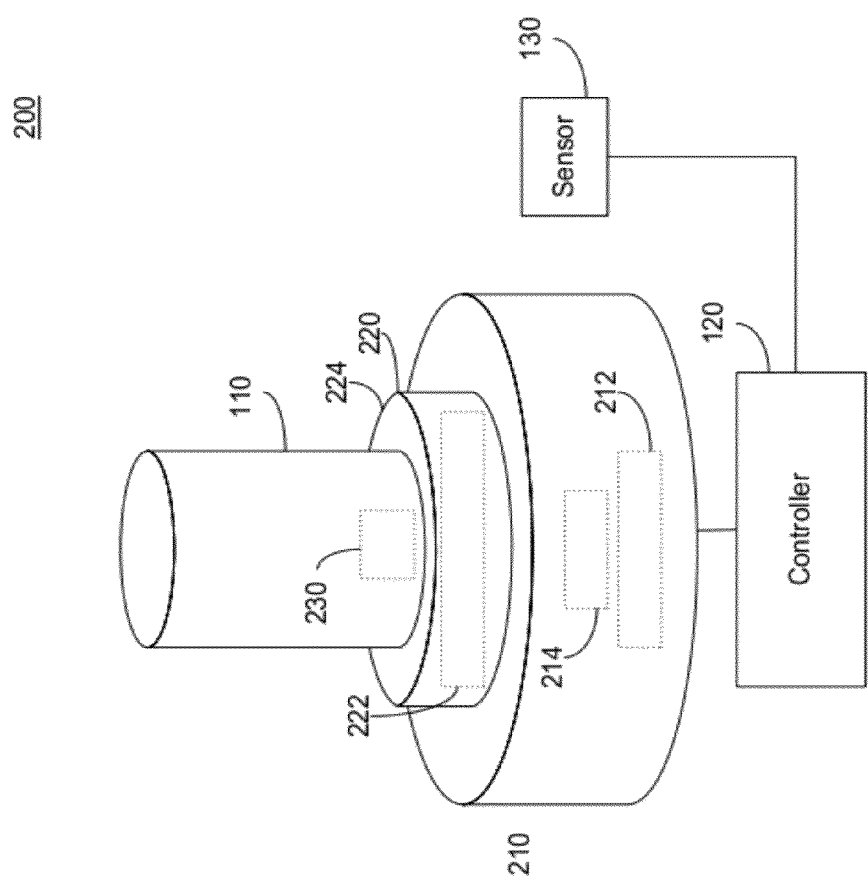
FIG. 2 is a ejection system for ejecting a payload from a payload delivery vehicle in accordance with an embodiment.

FIG. 2 illustrates an exemplary ejection system 200 for a payload 110. The ejection system includes a base 210 coupled to the payload delivery vehicle 100, an airbag ejection system 220 coupled to the base 210, and a payload separation system 230 coupling the payload 110 to the airbag ejection system 220.

The airbag ejection system 220 includes an airbag 222 and a protective sleeve 224. The airbag 222 can be manufactured from any known material and may be folded to reduce the amount of space. In one embodiment, the area that an airbag 222 is "folded" into may require that the entire airbag 222 be taken from its fully deployed stated, without gas, and then folded into the pre-deployed state. The folding process may be one that will facilitate that exact deployment steps to ensure that an angle and direction of the deployment of the payload 110 will meet a predefined end result and to allow for a deployment to be unrestricted. Also, the airbag 222 could have added features that will allow the fold to be made in the same way every time. These added features can also allow for a unique direction to be incurred to allow for the off center axis deployment.

The protective sleeve 224 should be made of a strong and flexible material. In one embodiment, for example, the protective sleeve can be made from a para-aramid synthetic fiber such as Kevlar™. The airbag 222 may have a single stage or multiple stages as discussed in further detail below. Each stage of the airbag 222 may have a single chamber or multiple chambers.

The base 210 is coupled to a motor 212 capable of inflating the airbag 222. The motor 212 may inject a gas (such as air or an inert gas) or a liquid to inflate the airbag 222. In one embodiment, the motor 212 may be connected to a valve system 214. The valve system 214 may control the rate at which the airbag 222 inflates. The valve system 214 may also control which chambers of the airbag 222 inflate as discussed in further detail below.

As discussed above, the payload separation system 230 connects the payload 110 to the airbag ejection system 220. The payload separation system 230 is controlled by the controller 120 to release the payload from the airbag ejection system at the appropriate time, for example, after the airbag 222 is fully inflated. The payload separation system 230 may be, for example, a clamp, self shearing bolts, a cable system, explosive shearing bolts, explosive shearing cables or any other release system or combination thereof.

The payload separation system 230 may also release the payload 110 based upon the output of the sensor 130. The sensor 130 may be sensitive to a position, light, sound, communication signals, a speed of the payload delivery vehicle 100 and/or a speed or location of a target of the payload 110 relative to the payload delivery vehicle 100. In one embodiment, for example, the sensor 130 and controller 120 may control the ejection of the payload no from the payload delivery vehicle 100 to ensure that the payload 110 is clear of the payload delivery vehicle 100, as discussed in further detail below.

Figure 3:
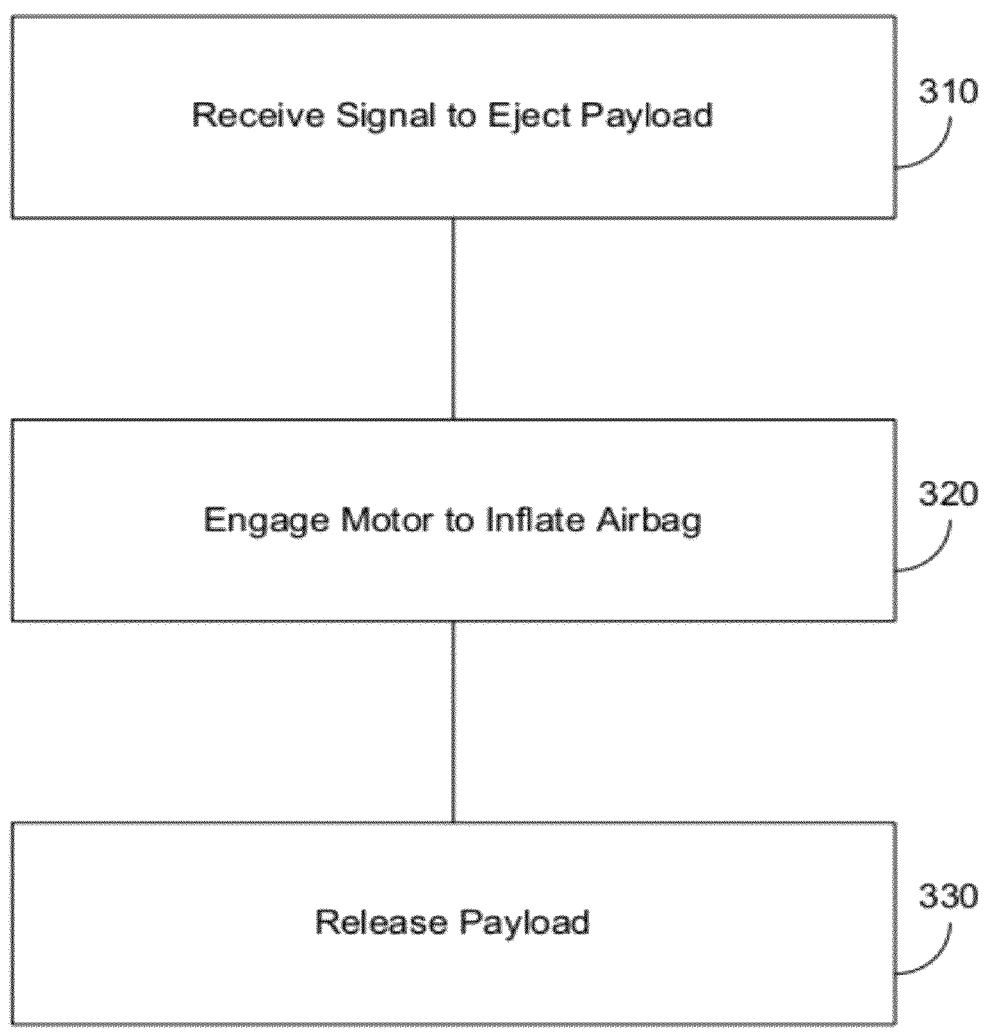
FIG. 3 is a flow chart illustrating an exemplary method for operating the ejection system illustrated in FIG. 2.

FIG. 3 illustrates a method 300 of ejecting a payload 110 from a payload delivery vehicle too. The method includes receiving, by the payload delivery vehicle too, a signal to deploy the payload 110. (Step 310). The signal may be received, for example, by a communications system (not illustrated) within the payload delivery vehicle too. In another embodiment, the signal may be generated by controller 120 which may be preprogrammed to eject a payload 110 at a predetermined time or when other predetermined conditions are met.

Figure 4:
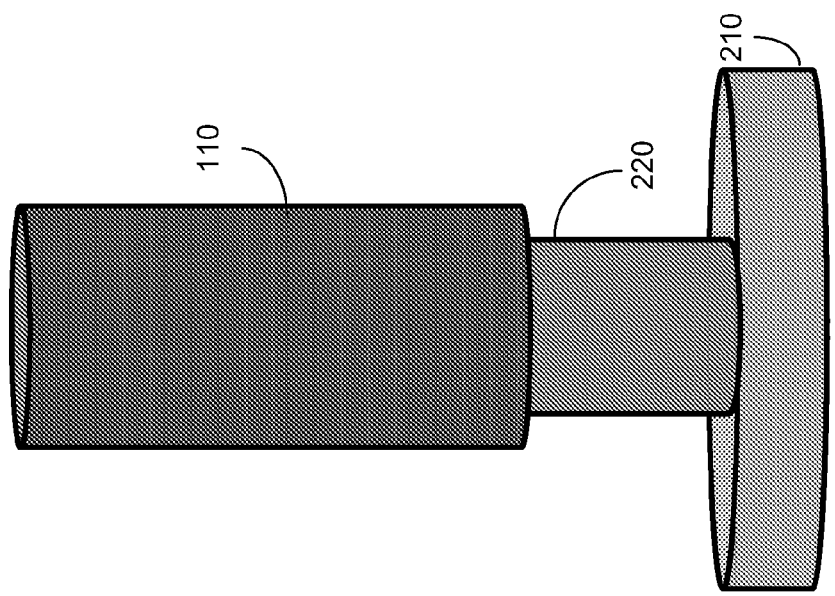
FIG. 4 illustrates an exemplary operation of the ejection system in accordance with an embodiment.

After receiving the signal to deploy the payload, the motor 212 is engaged to inflate the airbag 222. (Step 320). FIG. 4 illustrates the ejection system 200 after the motor 212 has begun to inflate the airbag 222. As seen in FIG. 4, the airbag 222 has increased in size and the payload 110 has begun to be pushed forward in preparation from being ejected from the payload delivery vehicle 100.

Returning to FIG. 3, after the airbag 222 is fully inflated, the payload 110 is released from the airbag ejection system 220. (Step 330). In another embodiment, the payload 110 may be separated from the airbag ejection system 220 prior to the full deployment of the airbag. For example, the payload 110 may be released once the payload has cleared the payload delivery vehicle 100. As discussed above, the sensors 130 may monitor the release of the payload 110 and send signals to the controller 120 which indicate when the payload 110 is safe to release. In yet another embodiment, the payload 110 may be released from the airbag ejection system 220 a period of time after the airbag ejection system 220 is fully deployed. For example, the payload 110 may be released after a predetermined period of time has elapsed after the airbag 222 is fully deployed. In another embodiment, for example, the payload 110 may not be released until a predetermined condition has been met. For example, the sensors 130 may monitor the position of the payload relative to a target of the payload and signal to the controller 120 to release the payload at an optimal time. The sensors may also monitor the position of the payload 110 and payload delivery vehicle 100 to ensure that the payload delivery vehicle 100 does not come into contact with the payload 110 after the payload is released.

Figure 5:
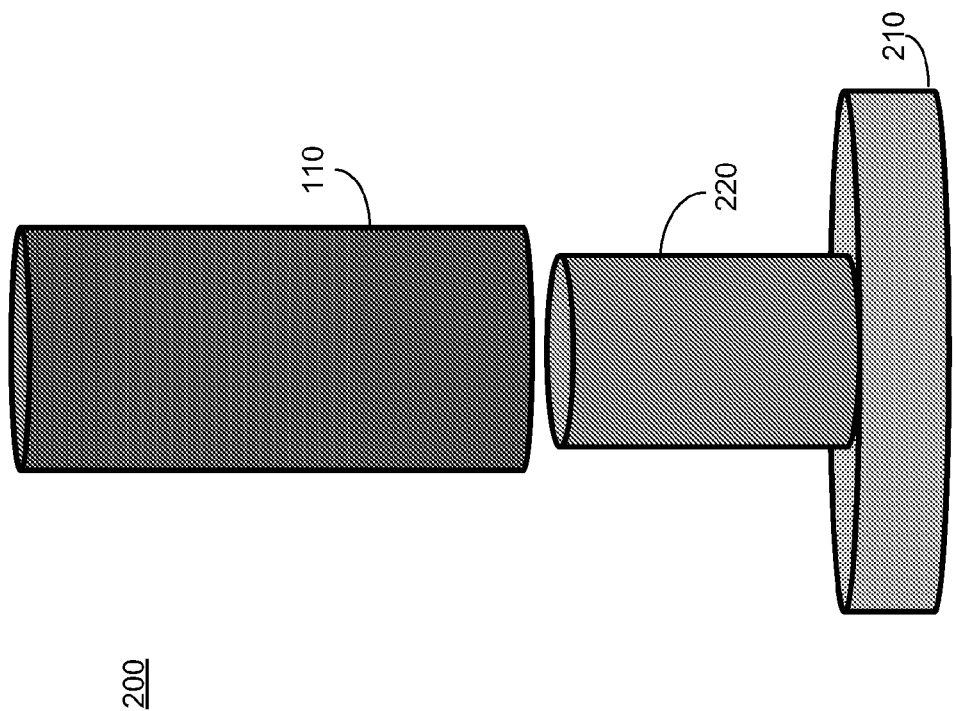
FIG. 5 illustrates another exemplary operation of the ejection system in accordance with an embodiment.

FIG. 5 illustrates the payload 110 after having been released from the airbag ejection system 220. As seen in FIG. 5, the airbag ejection system 220 is fully deployed (i.e., the airbag is full) and the payload 110 has separated from the airbag ejection system 220. As discussed above, the payload is released from the airbag ejection system via the payload separation system 230, which may be controlled by the controller 120 and sensor 130.

Figure 6:
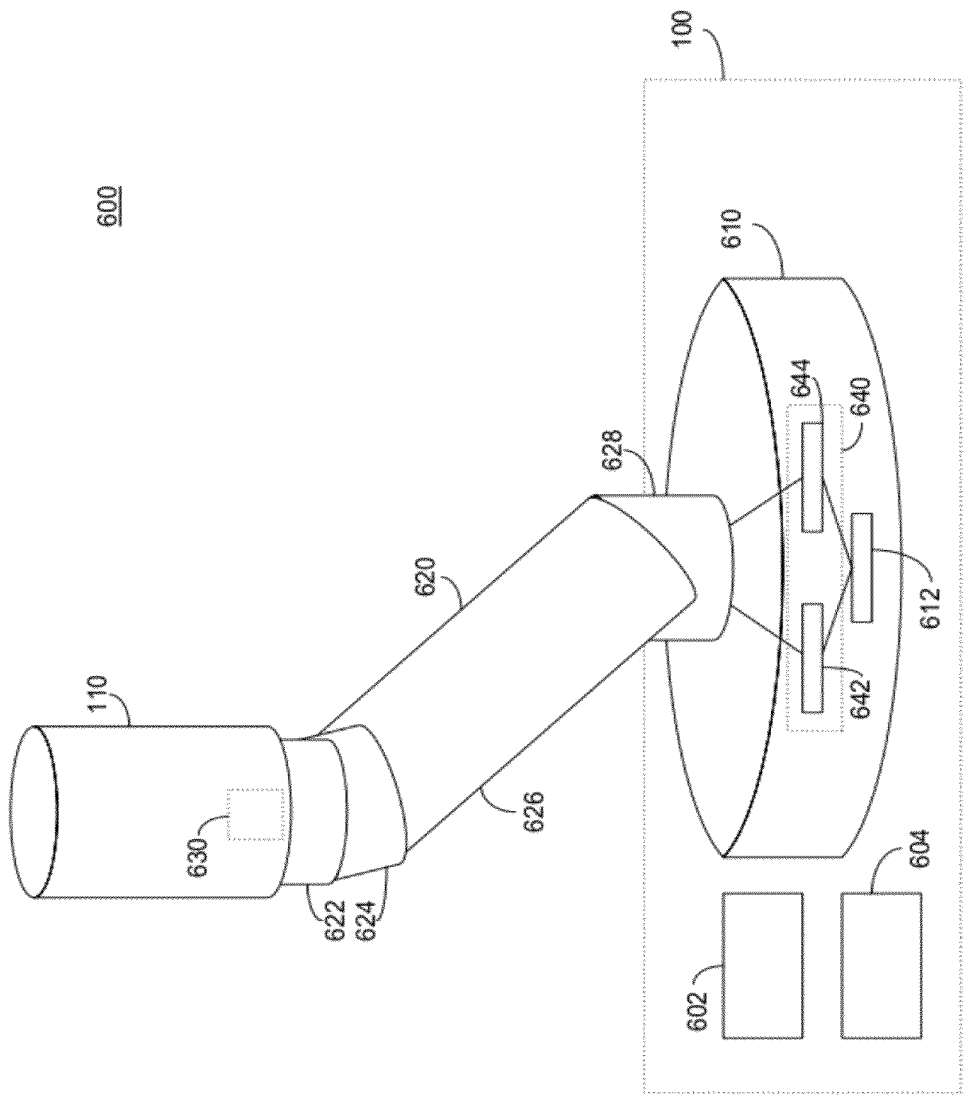
FIG. 6 is another ejection system for ejecting a payload from a payload delivery vehicle in accordance with an embodiment.

FIG. 6 illustrates yet another exemplary ejection system 600 for ejecting a payload 110 from a payload delivery vehicle 100 in accordance with an embodiment. The ejection system 600 includes a base 610 coupled to the payload delivery vehicle 100, an airbag ejection system 620 coupled to the base 610, and a payload separation system 630 coupling the payload 110 to the airbag ejection system 620. The airbag ejection system 620 illustrated in FIG. 6 has a four stage airbag system 622-628, however, any number of stages may be used. Furthermore, each stage of the airbag ejection system 620 may have separate chambers which may be selectively inflated as discussed in further detail below.

The base 610 includes a motor 612 capable of inflating the airbag ejection system 620 and a valve system 640 coupled between the motor 612 and the airbag ejection system 620. The valve system 640 may have multiple deployment systems, each capable of ejecting the payload at a different angle. For example, the valve system 640 illustrated in FIG. 6 has a deployment system 642 for ejecting the payload at an angle of zero degrees and another deployment system 644 for ejecting the payload at an angle of forty-five degrees, relative to the payload delivery vehicle 100. While the valve system 640 is illustrated to have two deployment systems 642 and 644 in FIG. 6, any number of deployment systems may be included. Furthermore, the deployment systems may eject the payload no at any angle relative to the payload delivery vehicle 100. Each deployment system 642 and 644 can be configured to deploy the airbag ejection system in a controlled manner. For example, when a multi-stage airbag is used, as illustrated in FIG. 6, each of the stages may be deployed simultaneously, or one-by-one in any order. Furthermore, the deployment systems 642 and 644 may be configured to inflate only select predetermined chambers within each stage of the airbag based upon the angle of deployment associated with the deployment system.

In another embodiment, the valve system 640 may have a single deployment system 642 to selectively inflate the stages and chambers of the airbag ejection system 620 to eject the payload at a determined ejection angle. For example, the deployment system 642 may have a serious of selectively operable valve which can be engaged by a controller 602 depending upon the desired ejection angle. As discussed above, the payload delivery vehicle may also have a sensor 604 which provides sensory input to the controller 602 so that the controller 602 can determine a desired ejection angle.

FIG. 7 is a flow chart illustrating an exemplary method 700 for ejecting a payload 110 from the payload delivery vehicle 100 illustrated in FIG. 6. The method 700 includes receiving, by the payload delivery vehicle 100, a signal to deploy the payload 110. (Step 710). The controller 602 then determines an angle at which to eject the payload 110. (Step 720). The angle may, for example, be a predetermined angle based upon a position of the payload no relative to the payload delivery vehicle 100. In another embodiment, for example, the angle may be determined based upon a direction the payload delivery vehicle 100 is traveling. For example, the payload no may need to be ejected at an angle so the payload delivery vehicle 100 does not come into contact with the payload no after the payload is ejected. The controller 120 may also determine the ejection angle based upon input from sensor 604. For example, the sensor 604 may monitor the position of the payload 110 relative to the payload delivery vehicle 100. The sensor 604 may also monitor the relative positions of the payload 110, the payload delivery vehicle 100 and a target of the payload. The target may be, for example, another object or a location.

The controller 602, based upon the determined ejection angle, may then operate a valve system 640 and the motor 612 to eject the payload 110 at the determined ejection angle. (Step 730). As discussed above, the controller 602 may engage a deployment system, for example deployment system 642, which is pre-configured to eject the payload at the desired angle. Alternatively, as discussed above, the controller 602 may selectively engage valves in the valve system 640 to selectively inflate stages and/or chambers with the stages of the airbag ejection system 620 to eject the payload no at the determined angle.

The controller 602, after the airbag ejection system 620 is fully inflated, may release the payload 110 using the payload separation system 630. (Step 740). In another embodiment, the payload 110 may be separated from the airbag ejection system 620 prior to the full deployment of the airbag. For example, the payload 110 may be released once the payload has cleared the payload delivery vehicle 100. As discussed above, the sensors 604 may monitor the release of the payload 110 and send signals to the controller 602 which indicate when the payload no is safe to release. In yet another embodiment, the payload 110 may be released from the airbag ejection system 220 a period of time after the airbag ejection system 220 is fully deployed. For example, the payload 110 may be released after a predetermined period of time has elapsed after the airbag ejection system 620 is fully deployed. In another embodiment, for example, the payload no may not be released until a predetermined condition has been met. For example, the sensors 604 may monitor the position of the payload no relative to the payload delivery vehicle 100 and/or a target of the payload and signal to the controller 602 to release the payload at an appropriate time.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An airbag ejection system for ejecting a payload from a payload delivery vehicle, comprising:
   a base coupled to the payload delivery vehicle;
   an airbag coupled to the base;
   a payload separation system configured to selectively couple the payload to the airbag;
   a motor configured to inflate the airbag;
   a controller configured to engage the motor to inflate the airbag and further configured to control release of the payload by the payload separation system; and
   a sensor configured to determine a position of the payload relative to a position of the payload delivery vehicle;
   wherein the controller is further configured to signal the payload separation system to release the payload from the airbag ejection system based at least in part upon the position of the payload relative to the position of the payload delivery vehicle determined by the sensor.

2. The airbag ejection system of claim 1, further comprising a sleeve substantially covering the airbag, wherein the airbag has at least one stage, the at least one stage having at least one inflatable chamber therein.

3. The airbag ejection system of claim 2, further comprising:
   a valve system coupled to the airbag, the valve system configured to selectively fill the at least one inflatable chamber of the airbag,
   wherein the controller is further configured to determine an ejection angle based upon the position of the payload relative to the position of the payload delivery vehicle and to engage the motor and the valve system to fill the airbag and eject the payload from the payload delivery vehicle at the ejection angle.

4. The airbag ejection system of claim 3, wherein the sensor is further configured to determine a position of the payload relative to a position of a target of the payload, and the controller is further configured to determine the ejection angle which would eject the payload towards the target.

5. The airbag ejection system of claim 4, wherein the payload delivery vehicle is an airborne munition.

6. The airbag ejection system of claim 5, wherein the airborne munition is configured to operate in an outer atmosphere.

7. The airbag ejection system of claim 3, wherein the valve system further comprises a plurality of deployment systems, each of the plurality of deployment systems configured to fill the at least one inflatable chamber in the airbag such that the payload is ejected at a unique angle relative to the payload delivery vehicle.

* * * * *